United States Patent
Filo

[11] Patent Number: 5,311,017
[45] Date of Patent: * May 10, 1994

[54] IMAGING DEVICE AND METHOD FOR DEVELOPING, DUPLICATING AND PRINTING GRAPHIC MEDIA

[75] Inventor: Andrew S. Filo, Cupertino, Calif.

[73] Assignee: Simon Marketing, Inc., Los Angeles, Calif.

[*] Notice: The portion of the term of this patent subsequent to Sep. 29, 2010 has been disclaimed.

[21] Appl. No.: 902,611

[22] Filed: Jun. 23, 1992

Related U.S. Application Data

[63] Continuation of Ser. No. 598,266, Oct. 16, 1990, Pat. No. 5,151,595.

[51] Int. Cl.$^5$ .............................. G03G 5/00
[52] U.S. Cl. ..................... 250/316.1; 250/317.1; 250/271; 273/139; 283/85; 283/903
[58] Field of Search ............ 250/316.1, 317.1, 271; 273/139; 283/85, 903

[56] References Cited

U.S. PATENT DOCUMENTS

| | | | |
|---|---|---|---|
| 2,254,717 | 9/1941 | Weiss | 95/72 |
| 2,813,043 | 11/1957 | Clark | 250/317.1 |
| 2,975,282 | 3/1961 | Schaffer | 250/65 |
| 3,073,234 | 1/1963 | Roganti | 95/75 |
| 3,092,004 | 6/1963 | Lewis | 95/73 |
| 3,295,430 | 1/1967 | Limberger | 95/73 |
| 3,418,149 | 12/1968 | Newman | 117/37 |
| 3,445,164 | 5/1969 | Browning | 355/82 |
| 3,508,344 | 4/1970 | Thomas | 35/9 |
| 3,617,324 | 11/1971 | Thomas | 117/1.7 |
| 3,784,394 | 1/1974 | Bildusas et al. | 117/1.7 |
| 3,793,025 | 2/1974 | Vrancken | 96/36 |
| 3,855,928 | 12/1974 | Kinney | 101/471 |
| 3,904,292 | 9/1975 | Ravich | 355/100 |
| 3,904,877 | 9/1975 | Hasegawa | 250/317 |
| 3,920,863 | 11/1975 | Fraik | 427/145 |
| 3,933,094 | 1/1976 | Murphy et al. | 101/426 |
| 3,944,422 | 3/1976 | Nihyakumen | 96/49 |
| 4,042,391 | 8/1977 | Fukutani | 96/47 |
| 4,049,843 | 9/1977 | Gaynor | 427/43 |
| 4,051,283 | 9/1977 | Thomas et al. | 428/29 |
| 4,109,937 | 8/1978 | Gager | 282/27.5 |
| 4,129,380 | 12/1978 | Fohl | 355/113 |
| 4,175,775 | 11/1979 | Kruegle | 283/7 |
| 4,176,277 | 11/1979 | Bricot | 250/316.1 |
| 4,199,615 | 4/1980 | Wacks et al. | 427/43.1 |
| 4,202,491 | 5/1980 | Suzuki | 235/491 |
| 4,242,439 | 12/1980 | Izu et al. | 430/346 |

(List continued on next page.)

FOREIGN PATENT DOCUMENTS 61-4362  1/1986  Japan ................. 358/497

OTHER PUBLICATIONS

"Chromicolour UV Screen Ink", Matsui Shikiso Chemical Co., Ltd.

"Physical Nature of Light", Optics Source Book, Science Reference Series pp. 122-127.

"Measurement of Light", Optics Source Book, Science Reference Series pp. 344-345.

"Electromagnetic Waves And Photons", Schaum's Outline Series; Theory and Problems of Optics, Eugene Hecht pp. 24, 25, 27.

"Advanced Audio Response Technology", Brochure by RTC Industries, Chicago, Ill. 60623.

Primary Examiner—Jack I. Berman
Attorney, Agent, or Firm—Robbins, Berliner and Carson

[57] ABSTRACT

The present invention provides an imaging device and method for developing, duplicating and printing graphic media. The imaging device of the present invention is utilized in devices such as copiers, printers, game cards and the like, and comprises a substrate bearing an infrared image producing layer, a thermal image forming layer and a light source. A brief but intense flash of visible light from the light source causes latent heat properties of the infrared layer to generate heat and convert visible light into far infrared light. This far infrared light develops or marks portions of the thermal layer which are adjacent the infrared layer.

6 Claims, 7 Drawing Sheets

| | | | |
|---|---|---|---|
| 4,405,862 | 9/1983 | Bricot et al. | 250/318 |
| 4,408,121 | 10/1983 | Galatha | 235/494 |
| 4,452,843 | 6/1984 | Kaule et al. | 428/199 |
| 4,460,676 | 7/1984 | Fabel | 430/333 |
| 4,480,177 | 10/1984 | Allen | 235/379 |
| 4,519,632 | 5/1985 | Parkinson et al. | 283/75 |
| 4,525,412 | 6/1985 | Nakane et al. | 428/199 |
| 4,540,595 | 9/1985 | Acitelli et al. | 427/7 |
| 4,577,291 | 3/1986 | Cornet | 365/126 |
| 4,602,263 | 7/1986 | Borror et al. | 346/201 |
| 4,627,819 | 12/1986 | Burrows | 434/337 |
| 4,639,608 | 1/1987 | Kuroda | 250/578 |
| 4,650,320 | 3/1987 | Chapman et al. | 356/71 |
| 4,652,512 | 3/1987 | Ishida | 430/179 |
| 4,672,219 | 6/1987 | Iwabuchi et al. | 250/578 |
| 4,677,553 | 6/1987 | Roberts et al. | 364/412 |
| 4,684,998 | 8/1987 | Tanioka et al. | 358/293 |
| 4,711,830 | 12/1987 | Haruta et al. | 430/52 |
| 4,755,831 | 7/1988 | Sakamoto | 346/1.1 |
| 4,788,124 | 11/1988 | Wright | 430/138 |
| 4,790,565 | 12/1988 | Steed | 283/85 |
| 4,791,493 | 12/1988 | Ogura et al. | 258/294 |
| 4,832,341 | 5/1989 | Muller et al. | 273/139 |
| 4,850,618 | 7/1989 | Halladay, Jr. | 283/94 |
| 4,903,991 | 2/1990 | Wright | 283/95 |
| 4,927,180 | 5/1990 | Trundle et al. | 283/70 |
| 4,965,638 | 10/1990 | Hediger | 355/235 |
| 5,063,462 | 11/1991 | Nakagawa et al. | 358/475 |
| 5,151,595 | 9/1992 | Filo | 250/316.1 |

BLACK BODY (CARBON INK) RADIATION OF XENON STROBE RADIATION

IMAGING DEVICE AND METHOD FOR DEVELOPING, DUPLICATING AND PRINTING GRAPHIC MEDIA

This is a continuation of prior application Ser. No. 598,266, filed on Oct. 16, 1990, which issued as U.S. Pat. No. 5,151,595 on Sep. 24, 1992.

FIELD OF THE INVENTION

This invention relates generally to the field of developing, printing and duplicating. More specifically, the invention relates to an imaging device and method for developing, printing and duplicating graphic media.

BACKGROUND OF THE INVENTION

Over the years, several different approaches have evolved for developing, printing and duplicating visible impressions on graphic media, such as paper or the like. A traditional approach to printing and duplicating typically uses ink or ribbons. Other prior approaches commonly use recording paper for copying and duplicating visible images. Recording paper has proved to be advantageous because it does not require the use of ink or ribbons and is generally reliable over a large range of conditions.

One type of recording paper commonly used is photographic paper which utilizes photographic processes and techniques to reproduce illustrations and images. Typically, light causes a chemical reaction to photosensitize a chemical on the photographic paper. This is followed by another chemical process which introduces a marking reagent to make the sensitized area visible. The use of photographic paper has some disadvantages. For example, it requires a two step process and complete darkness during the development process. In addition, it takes several minutes for the image to be developed.

Another type of recording paper is direct developing paper which reduces the two step process to a single chemical reaction. This reaction is caused by either electrical, magnetic or thermal energy. The chemical reaction renders the sensitized area visible.

Thermal recording paper, which is widely used in facsimile equipment and printers, was originally developed for use in instrument recorders used in airplanes and the like. In instrument recorders an ink pen was replaced with a heated wire which would write on the surface of the paper to form an image. Typically, the wire to be heated was mounted to a mechanical arm which would move across the paper. Subsequently, in order to replace the mechanical arm in these recorders, an array of hot wire pens was created. In such an arrangement, as the strip of thermal paper was moved past the array, the appropriate hot wire element would mark the paper to form an image. These arrays also form the print head in alphanumeric and graphical printers. Facsimile machines currently utilize hot wire elements to record images. The hot wire element operates in accordance with Joule's model of electric heating whereby resistance in a conductor produces heat. This heat causes a chemical reaction in a coating on the paper, which produces a visible change. This is not always desireable because the resolution of the image is often determined by the size of the heating element.

There are several different approaches to thermographically reproducing images. One approach creates special embossed effects in printing, such as stationary, invitations, greeting cards and paper decoration. To form a raised surface resembling die engraving without using costly engraving dies, special non-drying inks are applied, either by letter press or offset, and the wet inks are dusted with a powdered compound. After the excess powder on the non-printing areas is removed by suction, the sheet passes under a heater which fuses the ink and powder compound. The printing swells or raises in relief to produce a pleasing engraved effect.

Another approach is a reflex process, known as a dual spectrum process, which utilizes an original copy superimposed with a translucent sheet having a photosensitive coating. The photosensitive coating is not apparent to the unaided eye. Exposure to a brilliant light for several minutes causes the light to transmit through the translucent sheet, reflect off the original and alter the nature of the photosensitive coating. An opaque sheet having an infrared sensitive chemical coating is then positioned in contact with the translucent sheet. A second exposure, this time to infrared radiation, causes a chemical reaction in the infrared coating which reproduces the images on the opaque sheet. This process takes several minutes.

Another thermographic approach, which is also a reflex process, utilizes an original superimposed first with a transfer sheet and then with a recording or copy sheet which is a transparent or translucent paper or plastic sheet. The recording sheet has an adhesive layer which is positioned on the transfer sheet. Direct exposure to infrared radiation softens the adhesive layer on the recording sheet. The radiation transmitted in large part through the recording sheet and completely by the transfer sheet, is absorbed by the images on the original sheet. The absorbed radiation on the original generates a heat pattern corresponding to the shape of the original images and the heat pattern is conducted back to the transfer sheet causing portions of the transfer layer to melt. The melted portions of the transfer layer are absorbed into the areas of the adhesive layer in contact with the transfer layer to form imaged areas in the adhesive layer which are legible as direct reading images.

These prior approaches utilize transfer sheets, relatively large and undesirable amounts of infrared radiation and several minutes to form the images. In addition, all the prior approaches are relatively complex and expensive.

A need thus exists for an apparatus for developing, printing and duplicating graphic media which provides a direct and simple process by eliminating the use of transfer sheets, multiple chemical reactions and infrared radiation sources emitting hazardous amounts of infrared radiation. It would also be desirable to have a low cost apparatus and less expensive process.

SUMMARY OF THE INVENTION

The present invention provides an imaging device and method for developing, duplicating and printing graphic media which is simple, direct and low cost. The imaging device and method of the present invention is used in devices such as copiers, printers, game cards and the like. The imaging device in one embodiment comprises a substrate bearing an infrared image producing layer, a thermal image forming layer and a light source. A flash of visible light from the light source causes latent heat properties of the infrared layer to generate heat and convert visible light into far infrared light. This far infrared light develops or marks portions of the thermal layer adjacent the infrared layer.

In accordance with another embodiment of the present invention, the imaging device and method of the present invention are utilized in game cards. A game card is imprinted with a prize symbol, and infrared scanner zones identifying a prize, in an infrared absorbing ink. This image in infrared absorbing ink, of the prize symbol and of the scanner code, is masked with a non-infrared ink to appear invisible to the unaided eye. A thermal sensitive coating is deposited over the prize symbol so that it is further hidden from the unaided eye. The game card, when inserted in the game machine, triggers a flash bulb. The light from the flash is converted by the infrared ink into heat (infrared light) which is transferred up onto the thermal sensitive layer to expose the prize. The non-infrared active ink masking the prize symbol does not convert the visible light from the flash into infrared light and therefore does not affect the thermal layer. By detecting the presence or absence of the infrared active ink in each scanner zone, the infrared scanner zones trigger voice messages which announce the prize.

In still another embodiment of the present invention, the imaging device and method of the present invention are used in a standard, disposable or handheld copier. A translucent thermal paper is placed between an original and a copy glass. An intense flash of light exposed to the printed page through the copy glass and translucent paper causes the ink on the original to generate heat which marks the translucent paper to duplicate clear direct-reading images.

In yet another embodiment of the present invention, the imaging device and method is used in a printer. A head comprises an array of lamps which emit visible light onto an infrared ink strip that transfers heat onto paper treated with a thermal sensitive coating. This paper records the image as in a facsimile machine. The head also scans an original document imprinted with infrared radiating ink by sequentially activating the lamps and picking up radiated infrared light. A detector records the presence or absence of infrared radiation. Alternatively, the head scans the original document illuminating a portion of the original document. Visible light from the portion of the document is reflected by a detector which forwards information pertaining to the reflection to a buffer memory. The information is accessed and used to drive the lamps to reconstruct and print the image by marking on a thermal sensitive paper.

These as well as other features of the invention will become apparent from the detailed description which follows, considered together with the appended drawings.

BRIEF DESCRIPTION OF THE DRAWINGS

A preferred embodiment and alternative embodiments of the present invention are shown in and by the following drawings in which like reference numerals indicate like parts and in which.

DETAILED DESCRIPTION OF THE PREFERRED EMBODIMENTS

Figure 1:
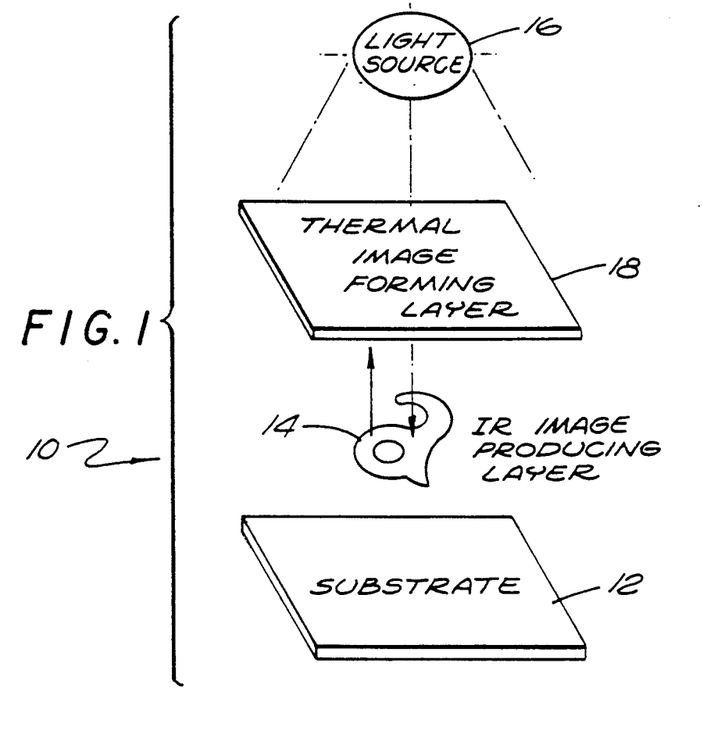
FIG. 1 is a diagrammatic representation of one embodiment of the imaging device of the present invention.

FIG. 1 generally shows an imaging device 10 for developing, duplicating and printing graphic media. The imaging device 10 utilizes a simple and direct process which produces clear and legible direct-reading images having a high resolution without damaging the original. In addition, the imaging device 10 is portable and operates at a low cost. It eliminates the need for a far infrared radiation source which is commonly utilized by prior devices. The illustrated embodiments are purely exemplary of other applications which can utilize the imaging device 10 and method of the present invention.

Figure 2:
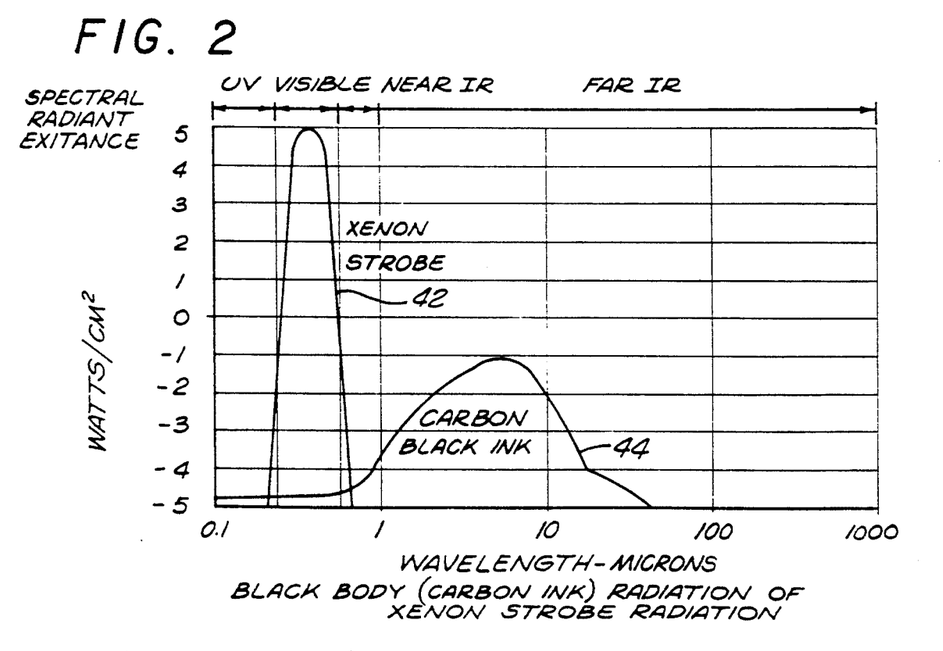
FIG. 2 is a graphical representation (log-log) of an infrared radiation response of carbon black ink to a flash of light from a tungsten filament.

Referring to FIGS. 1 and 2, the imaging device 10, in accordance with one embodiment, comprises a substrate 12 bearing an infrared image producing layer 14. The substrate 12 is of any suitable type, such as plastic, cardboard or paper, and the infrared layer 14 is a suitable ink. Exemplary inks that can be used are any inks having carbon black pigments such as india inks or newspaper black inks. Pigments are finely divided solid materials which give ink color and other optical properties such as opacity or transparency. In addition to color, important pigment characteristics include specific gravity, particle size, opacity, chemical resistance, wettability and permanence.

A light source 16 emits a flash of visible light which causes latent heat properties of the infrared layer 14 to convert visible light into far infrared light which is invisible to the unaided eye but is felt as heat. The flash of light is preferably brief but intense. The light source is any cold light source known in the art, such as a xenon strobe, filtered filament light, flash discharge and the like. The ink is preferably exposed for 200 microseconds to an average beam intensity of 1500 BWPS (beam watt per second) (or radiation of 100 Joules).

The infrared layer 14 is superimposed with a thermal image forming layer 18. The thermal layer 18 is any suitable thermal recording paper coating, hot melting ink or thermal changing coating known in the art. The far infrared light from the infrared layer 14 develops, exposes or marks portions of the thermal layer 18 which are in contact with the infrared layer 14.

Inks having suitable infrared radiating characteristics may be determined by conducting tests. Near infrared properties are easily determined by taking a sample ink and using a scanner, such as a reflective object sensor manufactured by TRW under model number OPB708. A high output measured by an oscilloscope indicates near infrared properties.

Far infrared characteristics of a sample ink are determined by testing its sensitivity to visible light. The test for far infrared uses a sensor such as Kynar film, available from Penwalt Corporation, King of Prussia, Pa. This film converts infrared energy to an electrical signal. The surface of the film is coated with a sample ink and exposed to the light source. The infrared heat is measured as the current produced by the ink on the Kynar film. The current may be measured by any known method in the art, such as by measuring the voltage across a resistor connected in parallel with the Kynar film.

Figure 2A:
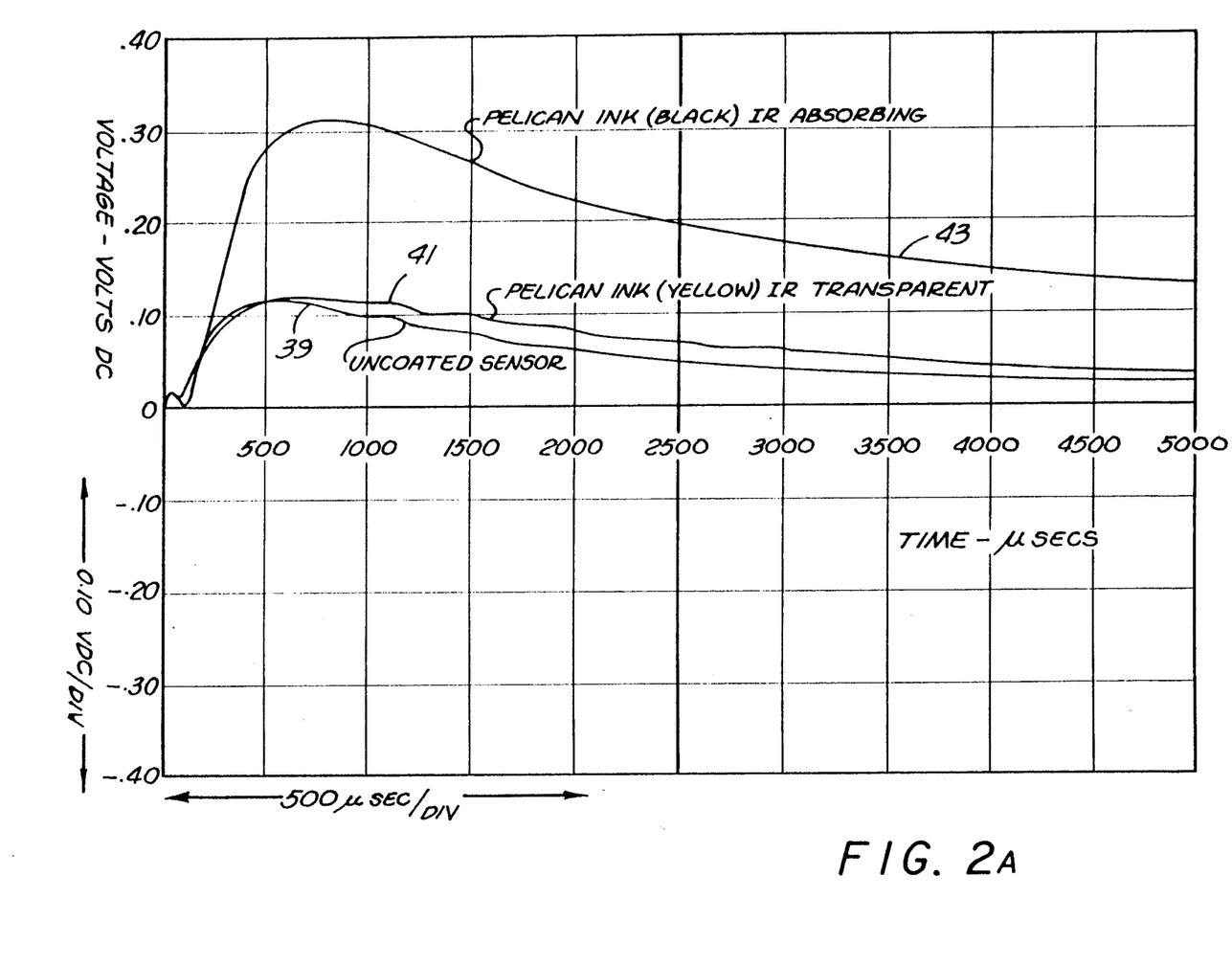
FIG. 2A is a graphical representation of the responses of an uncoated sensor made of a piece of Kynar film, a sensor which is coated with a non-infrared ink and a sensor which is coated with an infrared ink.

Referring now to FIGS. 2 and 2A, there are shown some exemplary graphical representations. FIG. 2 shows a graphical representation (log-log scale) of an infrared radiation response of carbon black india ink to a flash of light from a xenon strobe, indicating that the carbon black india ink has suitable infrared active characteristics (for converting visible light into infrared light). The carbon black ink was tested on Kynar film. Any ink may be tested in a similar way to determine if it is an infrared ink or a non-infrared ink. The graph illustrates the UV, visible, near infrared and far infrared regions of the light spectrum. At 42, there is shown the power distribution of an exemplary xenon strobe. The duration of a flash from the xenon strobe lasted 200 microseconds having a beam intensity of 1500 BWPS and radiation of 100 Joules. At 44, there is shown a response to the xenon strobe. The xenon strobe was a tube ¼ inch in diameter and 3 inches long.

Carbon black inks convert visible light into infrared light when exposed to a flash lasting 200 microseconds. The xenon strobe should emit a flash of light lasting 200 microseconds. A suitable xenon strobe may either be purchased or custom made for some applications. A tube of any given length produces a flash when connected to a circuit (not shown), known in the art, such as a RC discharge circuit, RLC critically damped discharge circuit or pulse forming network, which are commercially available. To ensure that the xenon strobe is capable of emitting a flash of light lasting 200 microseconds, the flash duration for any given tube may be determined by using the following equation:

flash duration = tube resistance × capacitor value/2 where the tube resistance is the specified resistance value provided by the manufacturer and the capacitor value is the value of the capacitor in the RC discharge circuit.

Generally, inks having a suitable pigment composition demonstrate a favorable thermal response to a flash of visible light. FIG. 2A shows a graphical representation of the electrical responses of a sensor made of Kynar film which is 2 $cm^2$ in area, to a flash of light having a beam intensity of 1500 beam watt per second (or radiation of 100 Joules) and lasting 200 microseconds. An electrical response of an uncoated piece of Kynar is shown at 39. The response of a sensor which is coated with pelican ink (yellow), which is a non-infrared ink, is shown at 41, and the response of a sensor which is coated with pelican ink (black), which is an infrared ink, is shown at 43.

In response to a visible light strobe, the ink must preferably demonstrate a minimum infrared heat generation or response of about 0.7 $W/cm^2$. This may be measured as shown in FIG. 2A. To determine the infrared heat generation of the ink on the Kynar film, the current produced is measured by connecting a 10k resistor in parallel with the Kynar film. As shown in FIG. 2A the Y axis of the graph represents voltage in 0.10 volts DC per division, and the X axis represents 500 microseconds per division. Using Ohm's law (V/R=I), each division on the Y axis represents 10 microamps per division. The infrared responsivity of Kynar is 1.5 microamps per watt of infrared radiation (as given by the manufacturer). Thus, for each 10 microamps/division on the graph, the Kynar response is 6.6 watts/division of infrared heat. The infrared generation of the pelican black ink is determined by subtracting the response of the uncoated Kynar from the infrared generated response of the Kynar coated with the pelican black ink. As shown in FIG. 2A, the difference in the peaks of responses 43 and 41 is approximately 2 divisions, representing approximately 12 watts of infrared heat. Since the area of the Kynar is 2 $cm^2$, the response is 6 watts/$cm^2$ of infrared heat. About 48-90 per cent of the light may be lost through the thermal coating, in which case the infrared radiation electrical response of the pelican black ink is 0.7 watt/$cm^2$ of infrared heat or greater.

The imaging device 10 develops images OF the infrared layer 14 which are invisible to or hidden from the unaided eye prior to developing. Alternatively, images are developed or exposed by selectively illuminating only part of a continuous infrared producing layer. An image may also be formed or exposed by selectively masking the light falling on the infrared producing layer through a template (not shown).

The infrared producing layer and thermal forming layer may be printed using any known method of printing, such as the gravure or lithographic printing process. The gravure printing process typically uses a sunken or depressed surface for the image. The image areas consist of cells or wells etched into a copper cylinder or wraparound plate (not shown). The cylinder or plate surface represents the non-printing areas. The plate or cylinder rotates in a bath of ink. The ink remaining in the thousands of recessed cells forms the image by direct transfer to the paper as it passes between the plate or cylinder and the impression cylinder.

FIGS. 3, 3A, 3B, 3C, 4, 5 and 6 show a second embodiment of invention utilized for game cards. A game card 20 is constructed for use in a game machine 22 (shown in FIG. 5). The game machine 22 may be mounted in a drive-thru (shown in FIG. 4) or within any facility such as a restaurant, store and the like, to provide recreational enjoyment and promotional benefit.

Figure 3:
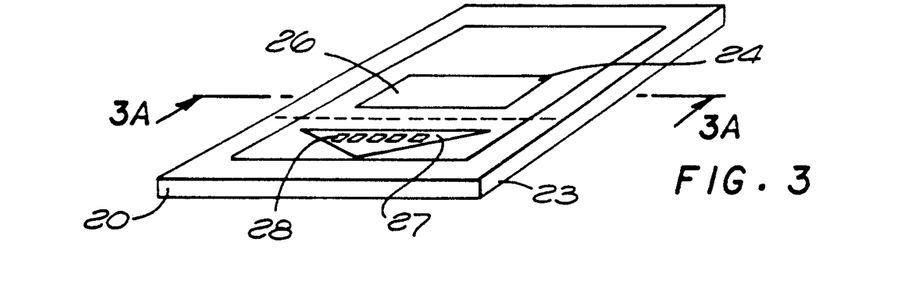
FIG. 3 is a perspective view of a second embodiment of the imaging device of the present invention used in a game card.
Figure 3A:
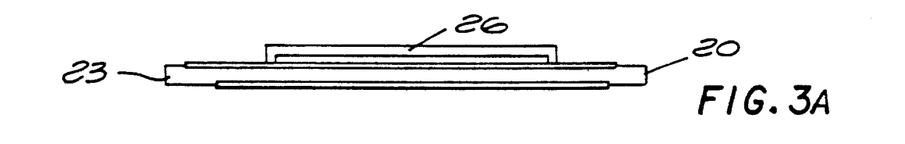
FIG. 3A is a cross sectional view of the game card shown in FIG. 3 taken along the line 3A—3A in FIG. 3.
Figure 3B:
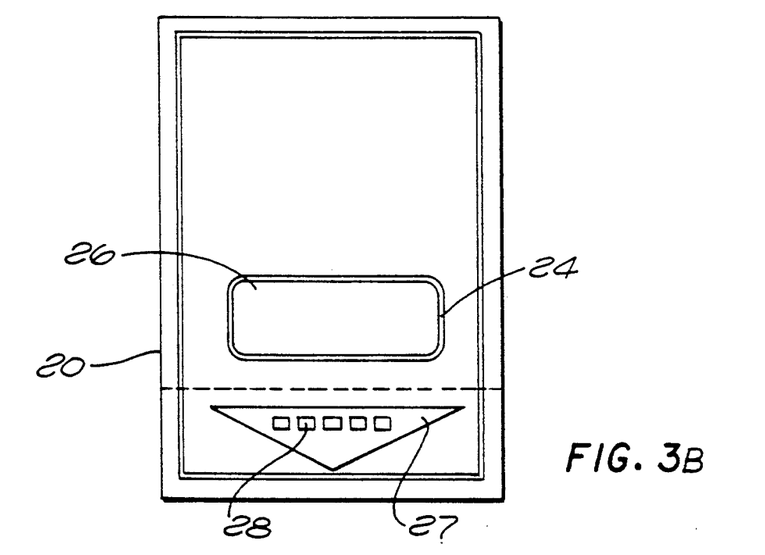
FIG. 3B is a top plan view of the game card shown in FIG. 3.
Figure 3C:
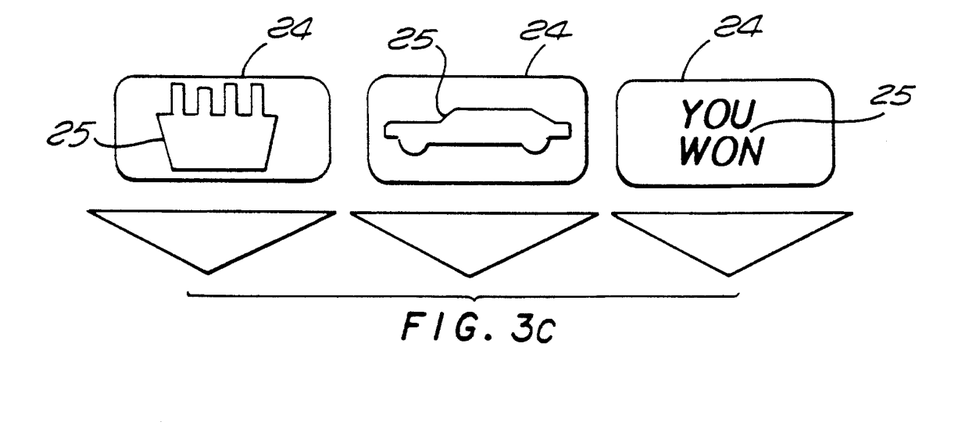
FIG. 3C is a diagrammatic representation of three exemplary prize symbols.
Figure 4:
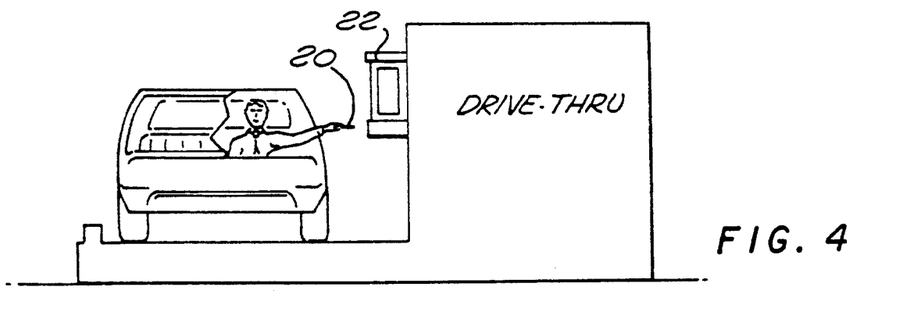
FIG. 4 is a diagrammatic representation of the game card shown in FIG. 3 being used in a game card machine mounted in a drive-thru.

The game card 20 comprises a cardboard substrate 23 imprinted by non-infrared active full color process printing. The substrate 23 is preferably an eight point cardboard. The game card 20 has a rectangular window 24 which is an area of the game card 20 where an image or symbol 25 representing a designated prize is imprinted using a suitable infrared active ink. As is shown in FIG. 3C, the prize symbol 25 may be an order of fries, a car or even a display informing a participant that he or she has won. The window 24 is masked with non-infrared radiating ink and the thermal forming layer so that the prize symbol 25 is not visible to the unaided eye.

The game card 20 also comprises a prize code area 27 disposed at a desired location on the game card 20. The code area 27 comprises five binary zones 28 making up a code which identifies the prize image 25 in the window 24. The prize image 25 is encoded in infrared active ink. The binary zones 28 are selectively printed with infrared ink to designate a 'one', or are left empty to designate a 'zero'. The unprinted zones are masked with non-infrared ink, so that the entire prize code area 27 is filled with either infrared ink or non-infrared ink to appear as a visually identical area to the unaided eye. By detecting the presence or absence of infrared ink in the binary zones 28, the game machine 22 can determine any of a predetermined number of combinations designating a particular prize and voice message.

Figure 6:
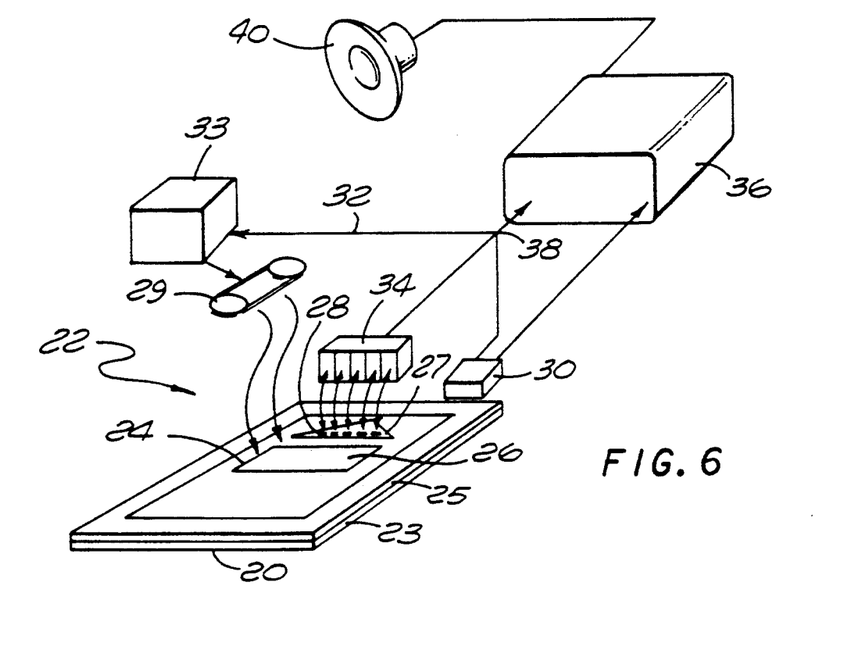
FIG. 6 is a block diagram of the game card and the components of the game card machine.

The presence or absence of infrared ink is encoded on the card in a binary pattern. This pattern is used to activate digital circuitry (not shown) to generate an audio or visual response for the participant. The presence or absence of infrared ink in each of the binary zones 28 is detected by a code sensor 34 to determine any of a predetermined number of combinations designating a particular prize. The code sensor 34, of any conventional type, is preferably an array of infrared LEDS (light emitting diodes) (not shown). Infrared light is emitted from the LEDS at a 45° angle from the perpendicular onto each zone 28 being detected. The LEDS preferably provide a 0.9 micron wavelength of radiation. The infrared LEDS are low powered providing near infrared radiation which is sufficient only for detecting the presence of any infrared active ink. The reflected light is gathered by a silicon phototransistor (not shown) known in the art. The output from the phototransistor varies depending upon the amount of infrared light detected. No reflection of light is an indication that the light has been absorbed by the infrared ink.

The infrared scanning zones of the present invention used in conjunction with conventional infrared scanners may also be utilized in other game applications, security systems, data entry systems and the like.

A thermal sensitive layer 26 is superimposed over the prize symbol 25 so as to further conceal the prize symbol from the participants and to only reveal the image to the participant through use of the game machine 22. The thermal sensitive layer 26 is a leuco and phenal based coating which utilizes a dye precursor, such as triphenylmethane or a fluoran compound, and a dye developer, such as Bisphenol A, as color forming material.

An intense pulse of light from a light source 29 (shown in FIG. 6) is directed through the thermal sensitive layer 26 and over the prize symbol 25. The light source 29 is a xenon strobe with a beam intensity of 1500 BWPS (and radiation of 100 Joules). The light source 29 is spaced 1 inch above the image to be formed to provide the best results. The pulse of light causes the infrared ink of the prize symbol 25 to heat up. This causes portions of the thermal layer 26 directly in contact with the infrared ink to reveal the prize symbol to the participant by changing visibly. The non-infrared ink used to mask the prize symbol does not affect the thermal layer when exposed to the light pulse.

Figure 5:
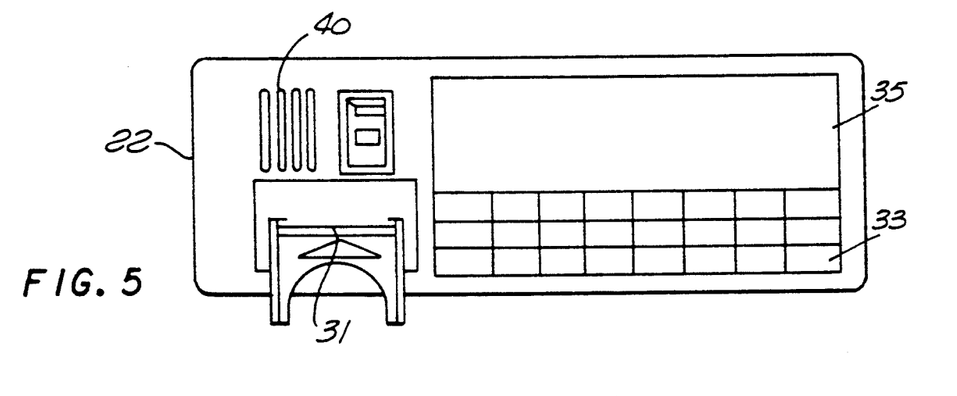
FIG. 5 is a front elevation view of the game card machine shown in FIG. 4.

The game machine 22 comprises a game card sensor switch 30 (shown in FIG. 6), known in the art, which detects the presence of the game card 20 inserted through a slot 31 in the game machine 22, as is shown in FIG. 5. A signal, indicated at 32, from the game card sensor switch 30 to a game card sensor 33, triggers the light source 29. Visible light from the light source 29 is absorbed by the infrared radiating ink on the inserted game card 20. The ink generates a heat pattern corresponding to the shape of the prize symbol 25 which is conducted to the thermal sensitive layer 26. This causes portions of the thermal sensitive layer 26 in contact with prize symbol 25 to visibly change.

The binary code of the zones 28 is revealed when illuminated by the infrared LEDS. The code sensor 34 (shown in FIG. 6) determines the prize code and forwards the information to a voice unit 36, via a signal indicated at 38. The voice unit 36 is of conventional design. The voice unit 36 announces the prize via a speaker 40, also of conventional design.

If the game card sensor switch 30 does not detect the presence of a game card 20, the voice unit 36 prompts a participant to insert the game card 20 into the game machine 22. If, after insertion, the prize code sensor 34 is unable to detect a binary code, it prompts a participant to check the game card 20.

As is shown in FIG. 5, the game machine 22 has a prize menu, indicated at 33, a display panel 35 and other desirable features.

The game card machine 22 and game card 20 provide several advantages. Since the prize symbol 25 and the code of the prize area 27 are imprinted on the game card 20, they cannot be altered by a participant to show favorable results. By using a combination of infrared ink and non-infrared ink for the binary zones 28 and the code area 27, and by printing the prize symbol 25 in infrared radiating ink on a background of non-infrared radiating ink, both the binary code and the prize symbol are hidden from the unaided eye. If the prize symbol 25 is accidentally or intentionally exposed to a hot light source, the entire window area 24 turns completely black making the card useless. This feature discourages attempts to counterfeit, duplicate or tamper with the game card 20 in order to provide favorable results.

FIGS. 7, 7A, 7B, and 7C show a third embodiment of the present invention used in a scanning or printing application. A microcontroller 46 controls an entire printing or scanning system shown generally at 47. A scanner head 45 comprises a body portion 48 movably disposed between two spaced apart guide rods, an upper guide rod 50 and a lower guide rod 51. The body portion 48 is made from any suitable transparent material which allows passage of light. The head 45 moves along the guide rods 50 and 51 adopting a path indicated by the arrow 52, such as in conventional printers. A shuttle mechanism 55 controls the movement of the entire printing or scanning system 47.

Figure 7:
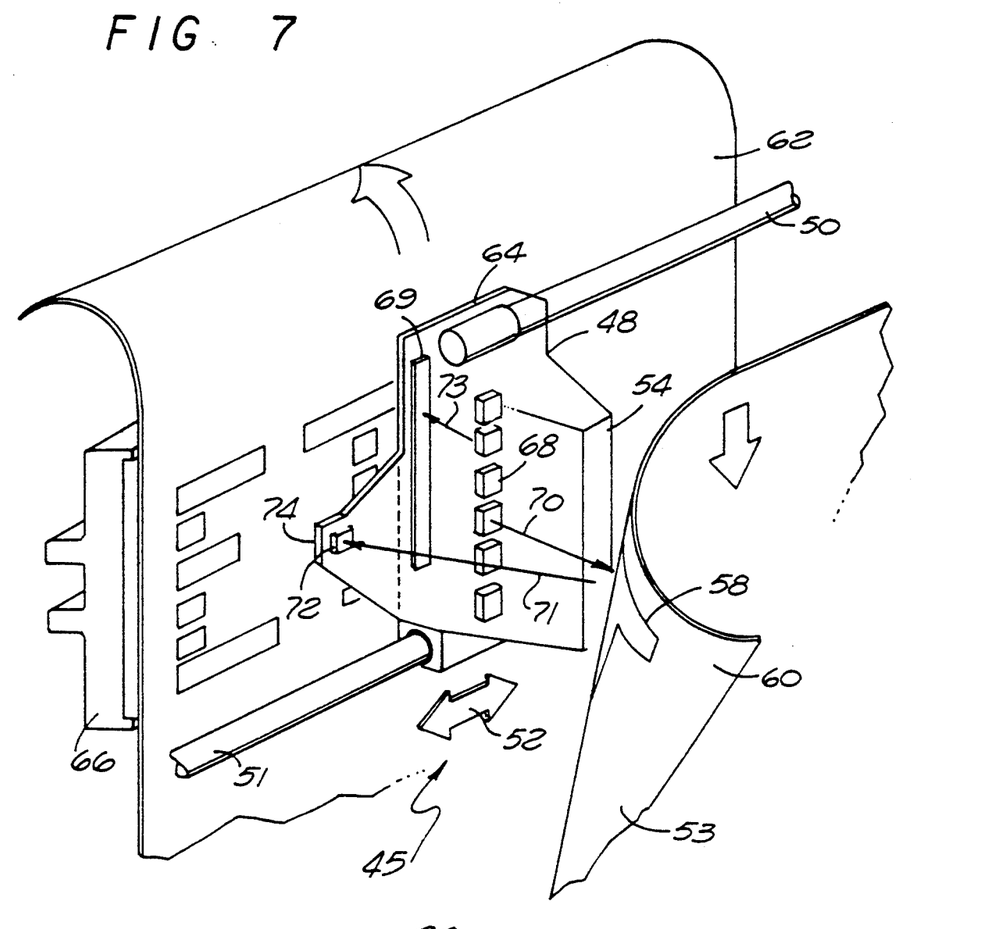
FIG. 7 is a perspective view of a third embodiment of the imaging device of the present invention used in a printer/scanner.
Figure 7A:
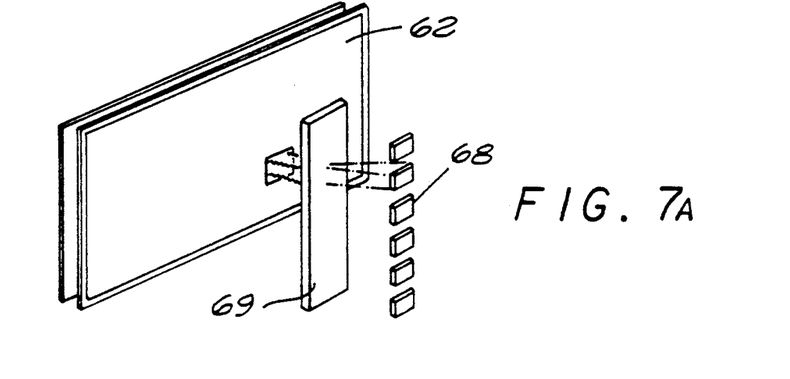
FIG. 7A is an exploded view of the third embodiment of the imaging device of the present invention showing the manner in which it prints.
Figure 7B:
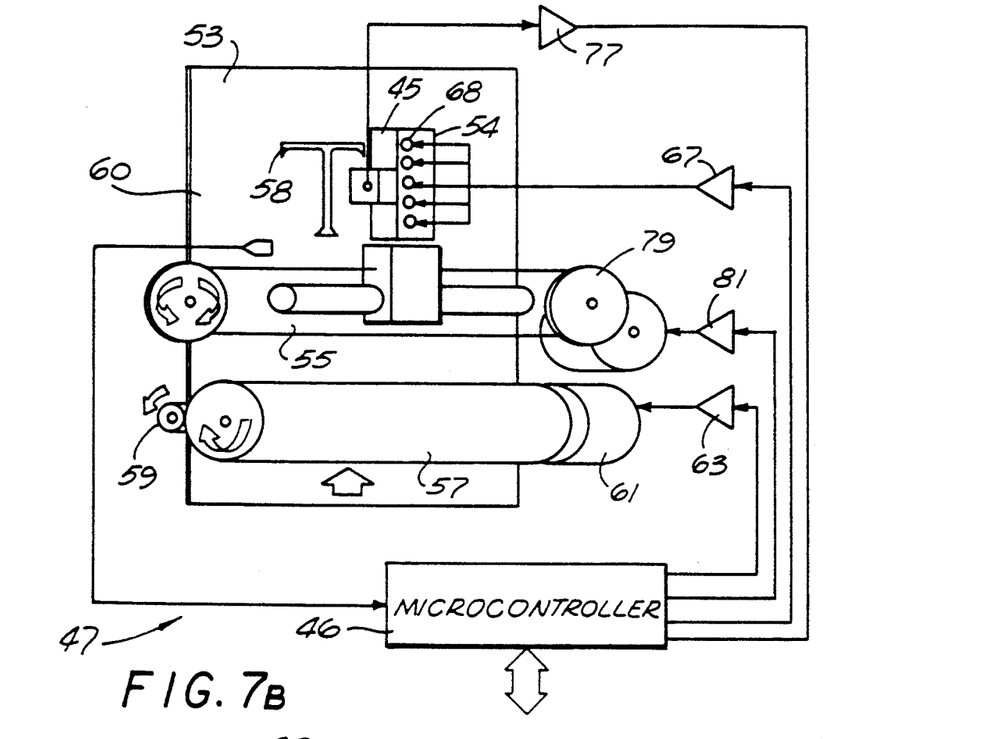
FIG. 7B is a block diagram of the third embodiment of the imaging device of the present invention showing a scanning mode.

In a scanning mode, best shown in FIGS. 7 and 7B, the head 45 scans an original document 53. The original document 53 is moved past the scanning head 45 by a roller 57 and a pinch roller 59. The roller 57 is driven by a stepper motor 61, which in turn is driven by a motor driver 63 controlled by the microcontroller 46. The original document 53, imprinted with any image, indicated at 58, on an adjacent surface 60 of the original document 53, is mounted adjacent side 54 of the Head 45. The head 45 has an array of lamps 68 disposed in alignment perpendicular to the guide rods. The lamps 68 are driven by lamp driver 67 controlled by the microcontroller 46.

The head 45 is driven by a stepper motor 79, which is driven by a motor driver 81 controlled by the microcontroller 46. As the head 45 shuttles back and forth on the guide rods 50 and 51, it scans the original document 53 from one end to the other. The lamps 68 sequentially flash pulses of light and illuminate portions of the original document 53. Visible light from the lamps 68 is emitted onto the original document 53, indicated by arrow 70, at a suitable angle, for example 30°, from the perpendicular (not shown in the drawings).

If the original document 53 is imprinted with a visible image, the surface of the original document 53 responds as typical in paper by reflecting this visible light, indicated by arrow 71. The reflected visible light is detected by a detector 72, preferably a silicone phototransistor of conventional design, disposed opposite the lamps 68 at the same angle from the perpendicular. Information conveyed by the reflection of light is forwarded through an analog-to-digital converter 77 and stored in a suitable buffer memory (not shown), known in the art. This information is accessed and used to drive the lamps 68 to reconstruct the image at a later time.

Alternatively, if the original document 53 is imprinted with infrared radiating ink, the detector 72 is a pyroelectric detector used to detect the presence and absence of infrared radiation. Visible light from one of the lamps 68 illuminates a portion of the original document 53, as indicated by arrow 70. The infrared radiating ink radiates infrared which in turn activates the detector 72 which is a suitable infrared sensor, such as a silicon photodiode or even a piece of Kynar film. The detector 72 generates an electrical signal proportional to the infrared energy falling upon it. The electrical signal is used as an imaging signal for forming images.

Figure 7C:
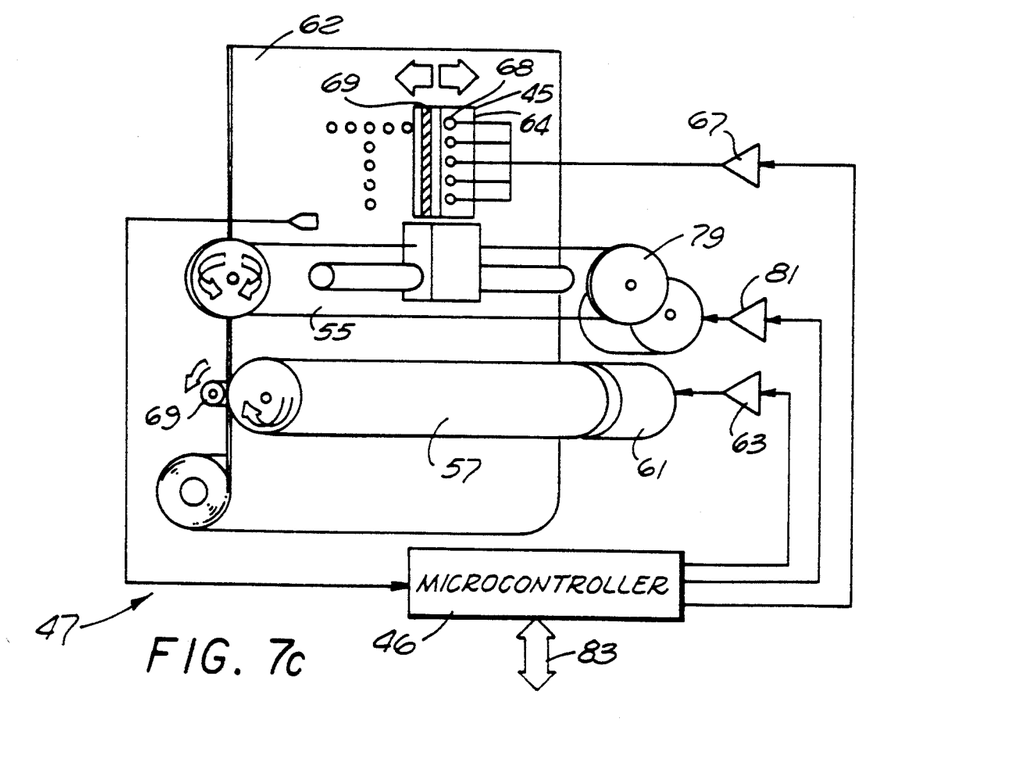
FIG. 7C is a block diagram of the third embodiment of the imaging device of the present invention showing a printing mode.

Referring now to FIGS. 7, 7A and 7C, in a printing mode, the head 45 comprises a strip of infrared ink 69 aligned along an axis parallel to and spaced from the array of lamps 68. A sheet 62 with a thermal sensitive coating is disposed adjacent side 64 of the head 45. The sheet 62 is supported against a suitable backing plate 66. Visible light from any one of the lamps 68 falls on the infrared active strip 69, which in turn converts visible light into infrared light and generates heat. This causes a visible reaction or marking on the thermal sensitive coating of the sheet 62. The head 45 creates dot-matrix letters on the sheet 62. Computers, facsimile machines, videos and the like, generate electrical signals transmitted on a bi-directional port 83 to the microcontroller 46 which activate the lamps 68 to form images. This technique replaces thermal heads that use hot wire methods.

Figure 8:
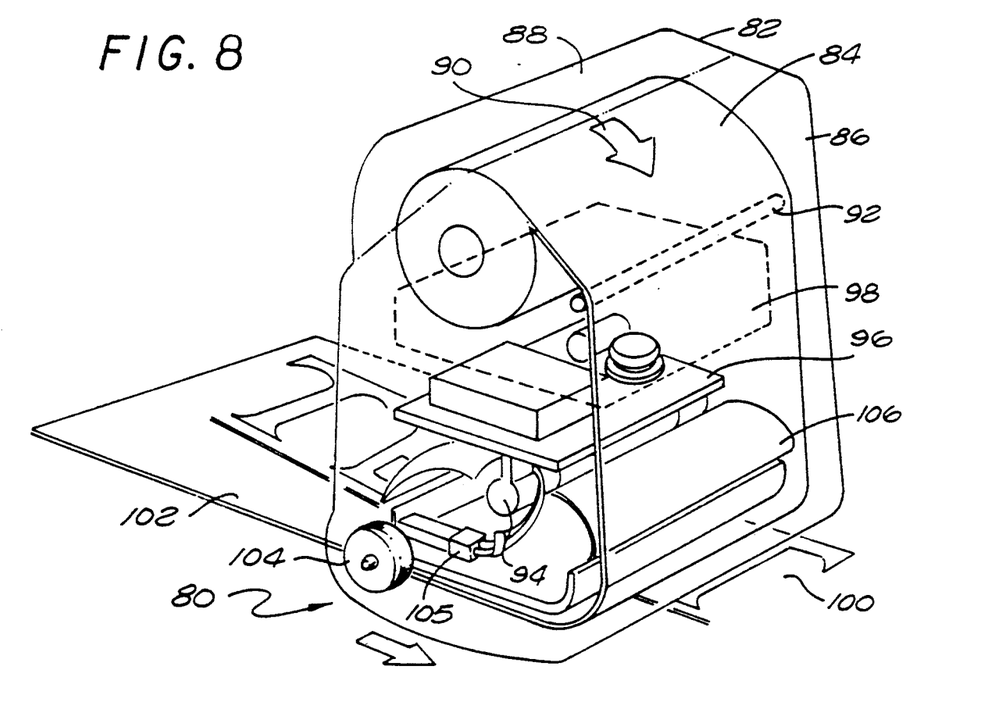
FIG. 8 is a perspective view of a fourth embodiment of the imaging device of the present invention used in a handheld or disposable copier.

FIG. 8 shows a fourth embodiment as a handheld copier. A copier 80 comprises a paper hatch 82 having a roll of paper 84, preferably translucent thermal paper, disposed in a paper compartment 86 located preferably at an upper end 88. The paper moves along a path indicated by arrow 90. The paper is guided by a guide pin, as shown at 92. Disposed directly below the paper roll is a lamp 94, a control circuit 96 and a battery 98 which provides power to the lamp 94 and the control circuit 96. The copier 80 is positioned directly over an original document 100 to be copied. The original document 100, as in the other embodiments described above, has images formed from infrared radiating ink.

The copier 80 is moved over portions of the original document 100 to make legible direct-reading copies 102. A clock wheel 104 and switch 105 senses or measures the movement of the copier 80 relative to the original document 100 As the copier 80 is moved over portions of the original document 100, the clock wheel 104 or switch 105 triggers the flash 94 to emit a pulse of light which illuminates the image or text to be copied. The pulse of light has an average beam intensity of 1500 beam watt per second (and radiation of 100 Joules). A reflector 106 reflects infrared radiation generated by the ink on the original document 100 onto the portion of the thermal recording roll of paper 84 which wraps around a pressure plate 108. This infrared radiation marks the portion of translucent paper 84 to duplicate clear direct-reading images. The pressure plate 108 (shown in FIG. 7) keeps the paper 84 properly positioned and in contact with the original document 100. In addition, the pressure plate 108 applies the necessary pressure required to ensure clear copies. The copier 80 is compact, handheld or disposable.

Figure 9:
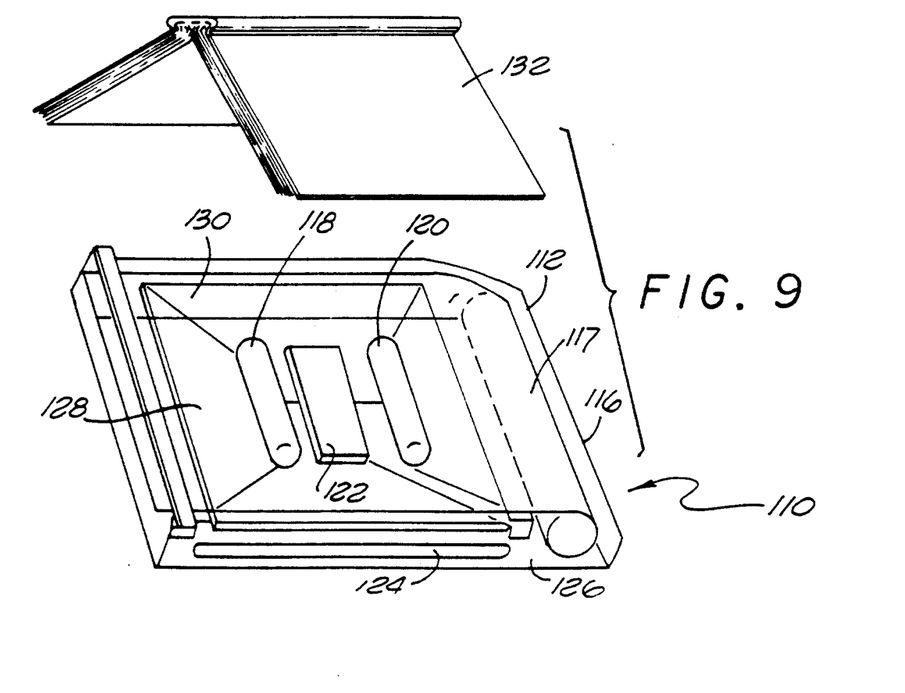
FIG. 9 is a perspective view of a fifth embodiment of the imaging device of the present invention used in a standard copier.

FIG. 9 shows a fourth embodiment of the present invention being used in a standard copier. A standard copier 110 comprises a housing 112 having a roll of copy paper 114 disposed at one end 116 of the housing 112. The copy paper 114 is preferably translucent thermal paper. Flash tubes 118 and 120 connected to a control circuit 122 are disposed in the center of the housing. Batteries 124, which provide power to the control circuit 122 and flash tubes 118, are located along a first end 126. A reflector 128 is disposed surrounding the flash tube 118 and control circuit 122. A copy glass 130 is positioned directly over the flash tube 118.

In operation, an original document 132, which may be a bound book, is placed on the copy glass 130 directly over the copy paper 114. Extremely intense light from the tubes 118 and 120, with an average intensity of 150,000 BWPS, is flashed through the copy paper 114 and onto the printed page of the original document 132 for a thousandth of a second, generating heat in the infrared radiating ink on the original document 132 for a brief instant. The heat darkens the translucent paper to make a perfect direct-reading image.

Although the invention has been described in terms of preferred embodiments thereof, other embodiments that are apparent to those of ordinary skill in the art are also within the scope of the invention. Accordingly, the scope of the invention is intended to be defined only by reference to the appended claims.

What is claimed is:

1. Apparatus for reproducing an image, comprising:
   a light source for emitting pulses of visible light;
   a substrate;
   an image including an infrared producing layer on said substrate, an image portion of said image producing layer responsive to said light source for converting said pulses of visible light into infrared light;

an image forming layer responsive to said infrared light to develop at least one portion of said image forming layer; and means in said image portion of said infrared image producing layer for forming an infrared image not visible to an unaided eye.

2. The apparatus of claim 1, wherein the image forming layer further comprises:

image forming means developed by infrared light from said image portion for reproducing said image.

3. Apparatus for reproducing an image, comprising:

a visible light source;

an image responsive to said light source for converting said visible light into infrared light;

an image forming layer responsive to said infrared light to develop at least one portion of said image forming layer;

a substrate supporting said image; and layer means on said substrate covering said image for obscuring said image until developed.

4. The apparatus of claim 3, wherein said image forming layer further comprises:

infrared light detector means for converting infrared light into electrical signals for developing said at least one portion of said image forming layer.

5. The apparatus of claim 4, wherein said source further comprises:

scanning means mounted for motion with respect to said image for emitting pulses of visible light.

6. The apparatus of claim 4, wherein said infrared light detector means is mounted for motion with said scanning means.

* * * * *